US005208613A

United States Patent [19]

Takeda

[11] Patent Number: 5,208,613

[45] Date of Patent: May 4, 1993

[54] IMAGE FORMING APPARATUS

[75] Inventor: Masami Takeda, Kawasaki, Japan

[73] Assignee: Canon Kabushiki Kaisha, Tokyo, Japan

[21] Appl. No.: 843,597

[22] Filed: Feb. 28, 1992

[30] Foreign Application Priority Data

Mar. 4, 1991 [JP] Japan .................................. 3-37411

[51] Int. Cl.[5] .............................................. G01D 15/06

[52] U.S. Cl. .................................... 346/154; 346/155; 346/160.1

[58] Field of Search ....................... 346/154, 155, 160.1

[56] References Cited

U.S. PATENT DOCUMENTS

| | | | |
|---|---|---|---|
| 3,673,600 | 6/1972 | Damouth | 346/155 |
| 3,914,771 | 10/1975 | Lunde et al. | 346/74 ES |
| 4,734,720 | 3/1988 | Ishii et al. | 346/155 |
| 4,739,348 | 4/1988 | Ando et al. | 346/155 |
| 4,831,394 | 5/1989 | Ochiai et al. | 346/160.1 |
| 4,887,103 | 12/1989 | Imai et al. | 346/160 |
| 4,910,538 | 3/1990 | Ochiai et al. | 346/162 |
| 4,943,819 | 7/1990 | Toma et al. | 346/160.1 |
| 5,001,501 | 3/1991 | Imai et al. | 346/160.1 |
| 5,144,343 | 9/1992 | Oba et al. . | |

FOREIGN PATENT DOCUMENTS 51-46707 12/1976 Japan .

*Primary Examiner*—George H. Miller, Jr.

*Attorney, Agent, or Firm*—Fitzpatrick, Cella, Harper & Scinto

[57] ABSTRACT

An image forming apparatus includes means for supplying a developing agent between electrically independent recording electrodes and a recording medium which is movable relative to the recording electrodes while a signal voltage is applied to the recording electrodes so as to form images. In order to prevent electric charges from being induced in the recording medium due to the electric charges accumulated in the vicinity of the recording medium, and thereby prevent unnecessary toner from being attached to the recording medium, the surface of a resin member which opposes the recording medium fulfills a charging preventing function.

6 Claims, 10 Drawing Sheets

IMAGE FORMING APPARATUS

BACKGROUND OF THE INVENTION

1. Field of the Invention

The present invention relates to an image forming apparatus, and more particularly, to an image forming apparatus, such as a printer or a display apparatus, in which a developing agent, such as a toner, is supplied between a plurality of recording electrodes and a recording medium while a signal voltage is applied to the recording electrodes so as to attach the toner to the recording medium.

2. Description of the Related Art

The aforementioned type of conventional image forming apparatus employs the image forming method disclosed in Japanese Patent Publication No. Sho 51-46707 (which corresponds to U.S. Pat. No. 3,914,771), and in U.S. Pat. Nos. 4,831,394, 4,910,538, 4,943,819 and 5,001,501. FIG. 2 shows an image forming apparatus which employs the above method and which is available on the market.

In FIG. 2, reference numeral 1 denotes recording electrodes; 2, a conductive magnetic toner; 3, a recording medium consisting of a surface layer 3*a*, a resistance layer 3*b*, a conductive layer 3*c* and a support layer 3*d*; 4, a plastic member; 5, a control circuit substrate; 6, a cleaning brush; 7, a rotary magnet; 8, a non-magnetic cylinder; and 9, a recording medium conveying roller. In the apparatus shown in FIG. 2, the conductive magnetic toner 2, which is a coloring substance, is conveyed over the non-magnetic cylinder 8 by the rotation of the rotary magnet 7, and is thereby supplied to a position overlying the recording electrodes 1. An electric charge ($10^{-8}$ to $10^{-7}$ coulomb) is induced in the toner 2 by the application of a voltage corresponding to an image signal generated by the circuit substrate 5 between the conductive layer 3*c* of the recording medium 3 and the recording electrodes 1, by which the toner 2 is electrostatically attached to the recording medium 3 (1000 to 10000 $pF/cm^2$) and an image is thereby formed. The endless belt-like recording medium on which the image has been formed makes one revolution, during which the cleaning brush 6, which utilizes volume resistance, scrapes the toner on the recording medium over the recording electrodes 1 located just below the brush 6 so that the toner can be used again.

In the aforementioned conventional image forming apparatus, a plastic forming resin is used to reduce the weight of the apparatus and production cost, and the member made of this plastic forming resin is provided near the surface of the recording medium (at a distance of 2 mm to 19 mm) in order to achieve reduction in the size of the apparatus. This approach causes the following problems.

Generally, plastic members are readily charged unless a special measure is taken to prevent charging. Normally, the plastic member has a surface potential between ± several tens of volts and ± several hundreds of volts. External influences, such as rubbing, can increase this potential to ± several kilo-volts.

The conventional image forming apparatus shown in FIG. 2 is characterized by requiring a recording voltage which is an order of magnitude less than that required by another recording means which employs a toner, such as an electrophotographic recording apparatus, i.e., the apparatus of FIG. 2 requires a voltage of several tens of volts. Therefore, the surface potential of the recording member must be more strictly controlled so that the recording medium has a desired potential over the entire surface thereof uniformly.

However, the use of the charged plastic member near the surface of the recording medium causes distribution of the potential on the surface of the recording medium to vary with time. This change in the distribution of the potential affects images adversely. The mechanism of generating changes in the potential distribution is estimated as follows.

FIG. 3 schematically illustrates the effect of an electric field generated between the recording medium 3 and the plastic member 4. The negative charge in the plastic member 4 generates an electric field between the plastic member 4 and the grounded conductive layer 3*c* in the recording medium in the direction indicated by the longer arrows. The generated electric field induces positive charges in the conductive layer 3*c*, and the induced positive charges move through the resistance layer toward the surface layer over a finite time in the manner indicated by the shorter arrows and are trapped in the interface between the resistance layer and the surface layer 3*a*. The trapped positive charges are not easily cancelled: they induce negative charges in the electrodes when 0 volt (representative of a white image signal) is applied to the recording electrodes during a subsequent recording, by which Coulomb's attractive force is generated and toner, which would not be otherwise attached, is attached to the recording medium. Consequently, unnecessary toner is attached to the white area of the recording medium where no toner image should be formed, and a phenomenon which deteriorates the image quality (hereinafter referred to as fog), thus occurs.

SUMMARY OF THE INVENTION

A primary object of the present invention is to provide an image forming apparatus which is capable of preventing application of an unnecessary electric field to a recording medium from a plastic member close to the recording medium, so as to ensure recording of images of high quality.

To achieve this object, the present invention provides an image forming apparatus which comprises electrically independent recording electrodes, a recording medium which can be moved relative to the recording electrodes, developing agent supply means for supplying a conductive developing agent between the recording electrodes and the recording medium, means for applying a signal voltage to the recording electrodes, and a resin member which opposes the recording medium. The resin member has a charging preventing function.

These and other objects, features and advantages of the present invention will be more fully understood from a consideration of the following detailed description of the preferred embodiments and the accompanying drawings, in which like reference characters indicate like elements throughout.

DETAILED DESCRIPTION OF THE PREFERRED EMBODIMENTS

The preferred embodiments of the present invention will be described below with reference to the accompanying drawings.

Figure 1:
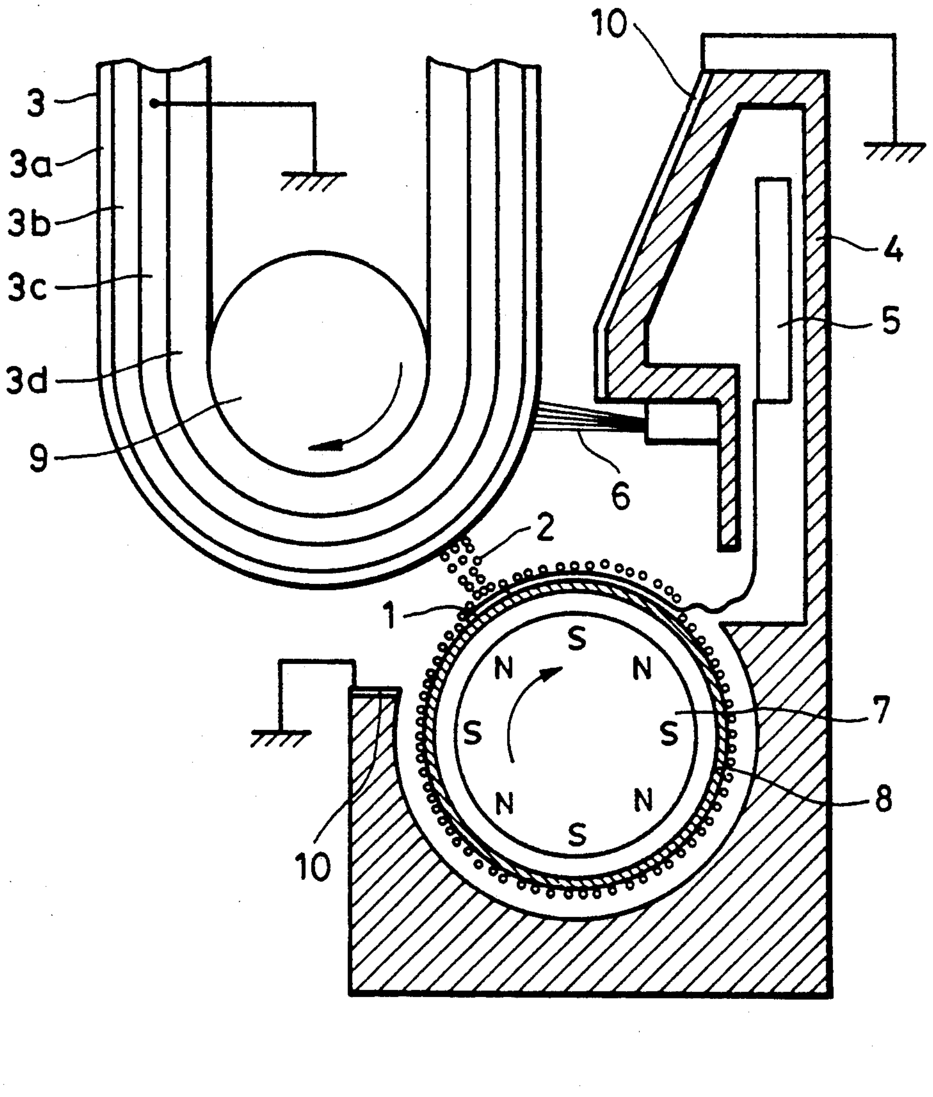
FIG. 1 is a cross-sectional view of a recording unit illustrating a first embodiment of the present invention.
Figure 2:
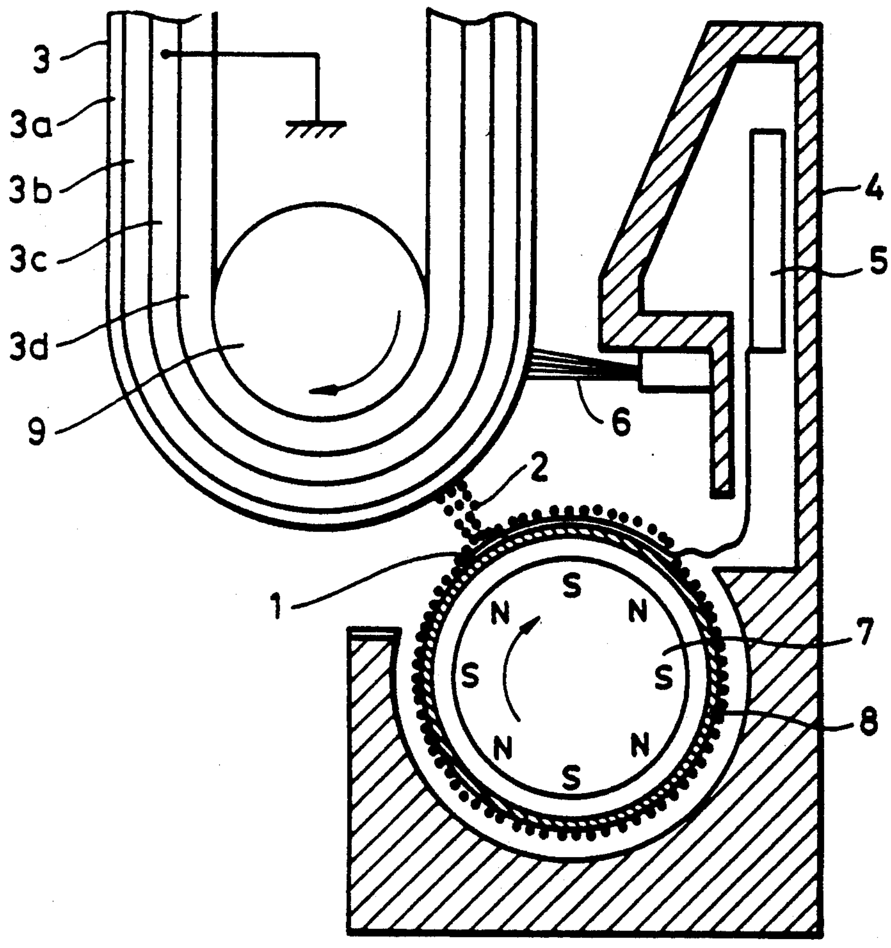
FIG. 2 (PRIOR ART)
FIG. 2 illustrates a recording unit of a conventional apparatus.
Figure 3:
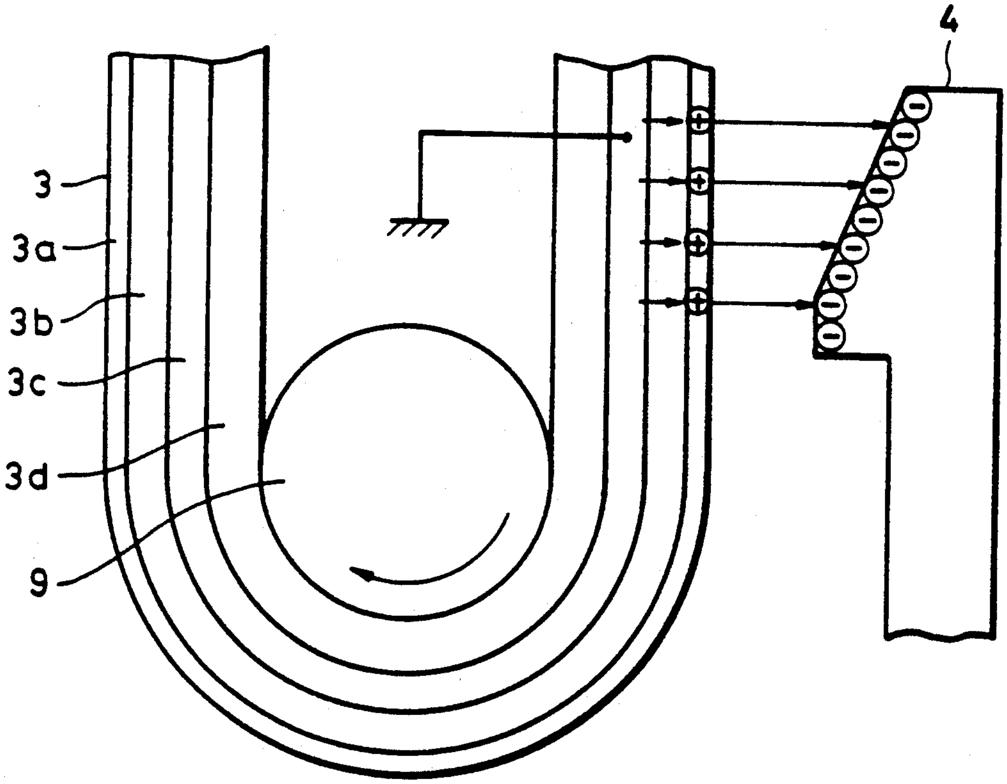
FIG. 3 (PRIOR ART)
FIG. 3 schematically illustrates the mechanism of generation of fog which occurs in a conventional apparatus.

FIG. 1 illustrates a first embodiment of an image forming apparatus according to the present invention. As mentioned, in FIG. 1, the members which are the same as those shown in FIG. 2 are denoted by the same reference numerals. In the recording medium 3, the surface layer 3*a* is made of a 1 to 20 μm thick plastic forming resin having a volume resistance of $10^7$ to $10^{16}$ Ωcm, such as a butyral resin, an acrylic resin, a nylon resin, a polyester resin, urethane resin or phenol resin or a combination thereof. The resistance layer 3*b* has a volume resistance of $10^0$ to $10^7$ Ωcm and a thickness of 5 to 30 μm, and is made of a plastic forming resin in which titanium oxide, aluminum oxide, tin oxide or indium oxide (or a combination thereof) is disperse. The conductive layer 3*c* is a 5 to 30 μm thick deposited conductive film having a volume resistance of $10^0$ to $10^2$ Ωcm and made of, for example, aluminum. The support layer 3*d* is made of a 70 to 300 μm thick plastic forming resin, such as polyethylene terephthalate resin or polyimide resin or both.

The conductive magnetic toner 2 is manufactured first by internally adding magnetic powder to a plastic forming resin and then by externally adding carbon to the plastic forming resin. The electric resistance of the conductive magnetic toner 2 in the direction in which toner particles are coupled to each other in a chain by the magnetic brush method is $10^3$ to $10^8$ Ωcm.

In this embodiment, a conductive member 10 which is a metal plate or a conductive tape is fixed to the surface of the plastic member 4 using, for example, an adhesive. The conductive member 10 is grounded through a lead using, for example, soldering.

Consequently, no matter how the plastic member 4 is charged, the surface potential of the plastic member 4 which opposes the surface of the recording medium 3 is maintained at 0 volt, and application of an undesired electric field to the recording medium 3 is thus avoided. As a result, generation of fog is prevented.

Figure 4:
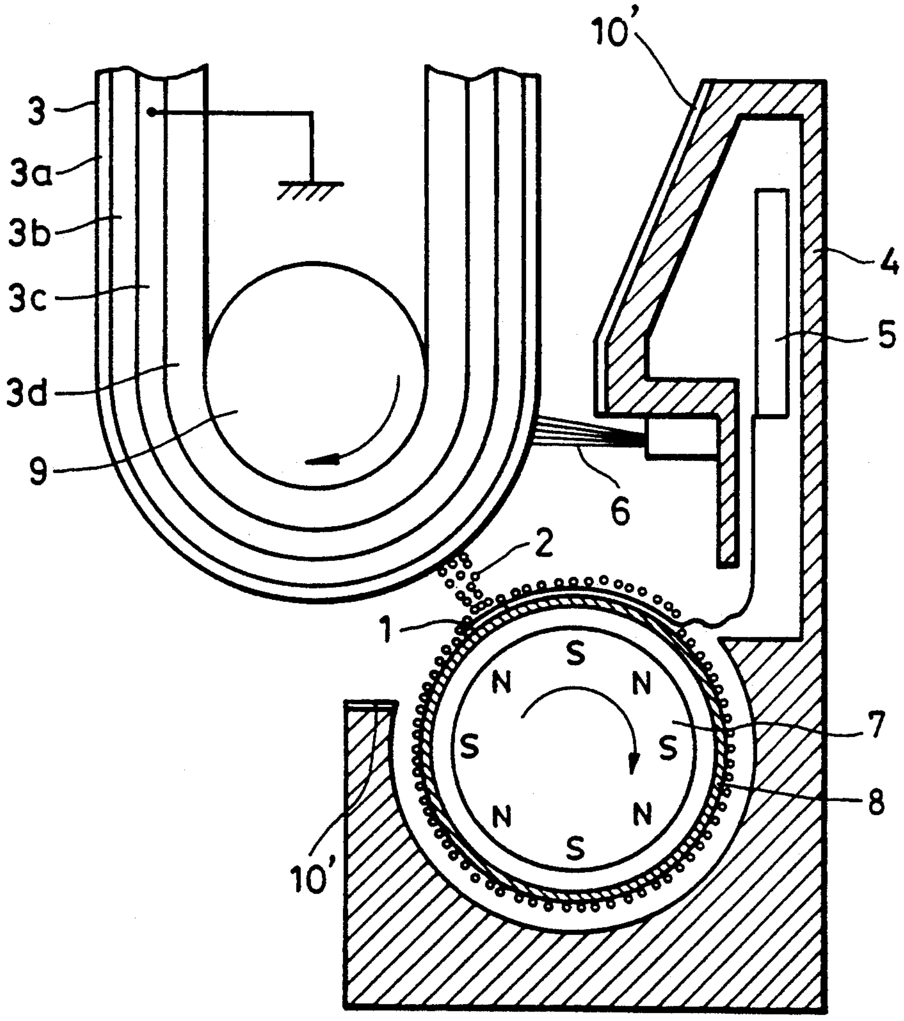
FIG. 4 is a cross-sectional view of the recording unit illustrating a second embodiment of the present invention.

FIG. 4 illustrates a second embodiment of the image forming apparatus according to the present invention. In this embodiment, the recording medium 3 and the toner 2 are the same as those used in the first embodiment.

In this embodiment, the surface of the plastic member 4 is coated with a coating 10' which may be a conductive coating material capable of reducing the surface resistance to $10^8$ Ωcm or less, or a known antistatic agent capable of suppressing generation of charging.

Consequently, no matter how the plastic member 4 is charged, the surface of the plastic member 4 which opposes the surface of the recording medium 3 is not readily charged and the surface potential thereof is thus maintained substantially at 0 volt. As a result, application of an undesirable electric field to the recording medium 3 can be avoided, and generation of fog can be prevented.

Figure 5:
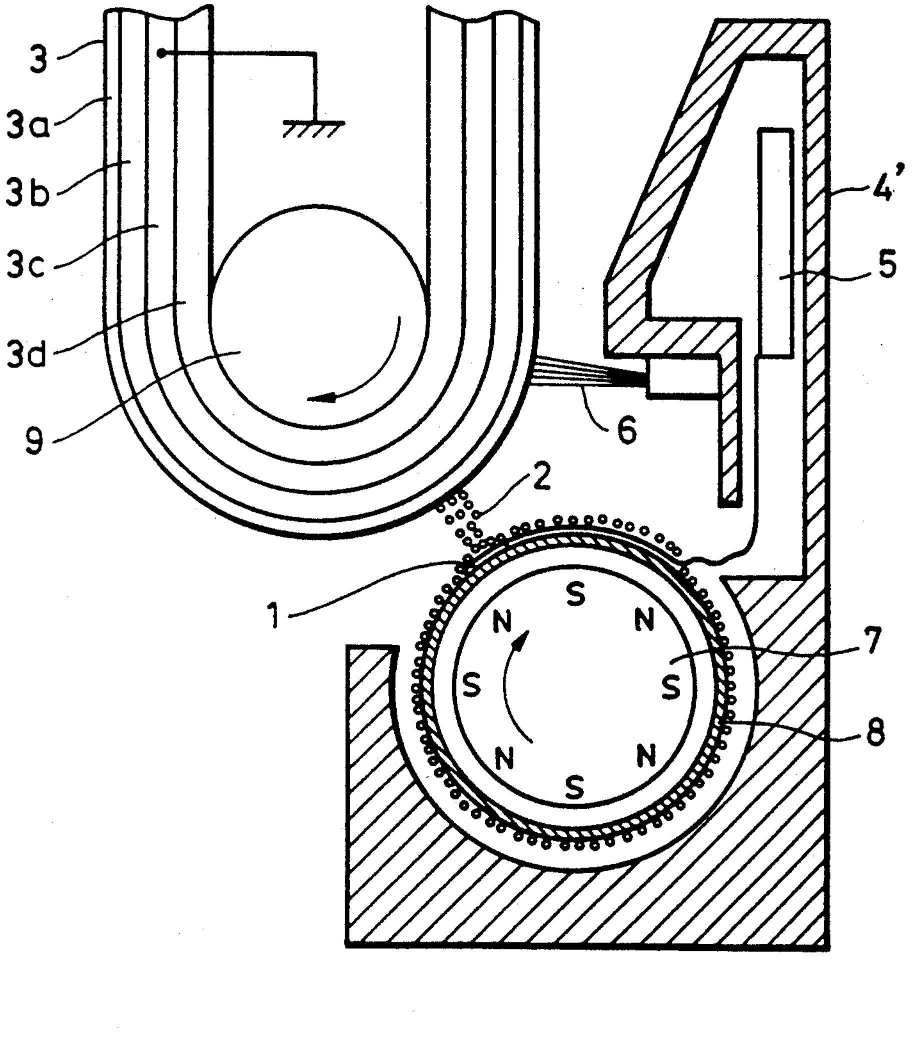
FIG. 5 is a cross-sectional view of the recording unit illustrating a third embodiment of the present invention.
Figure 6:
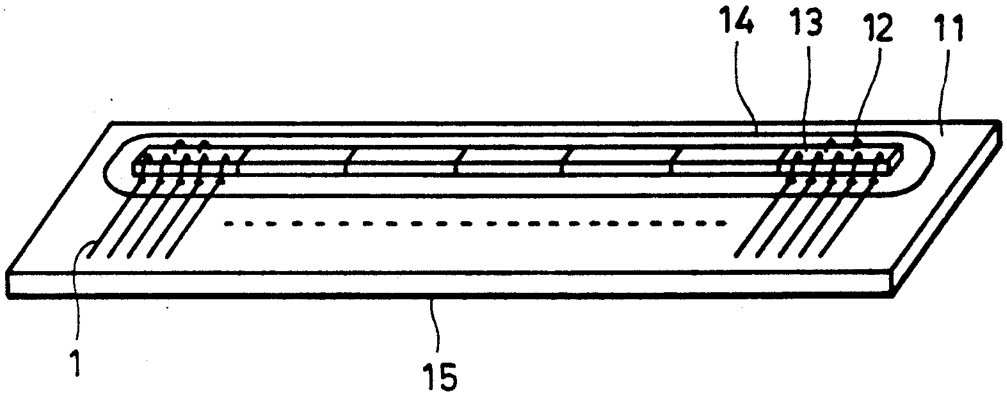
FIG. 6 is a perspective view of a modification of the recording electrodes.
Figure 7:
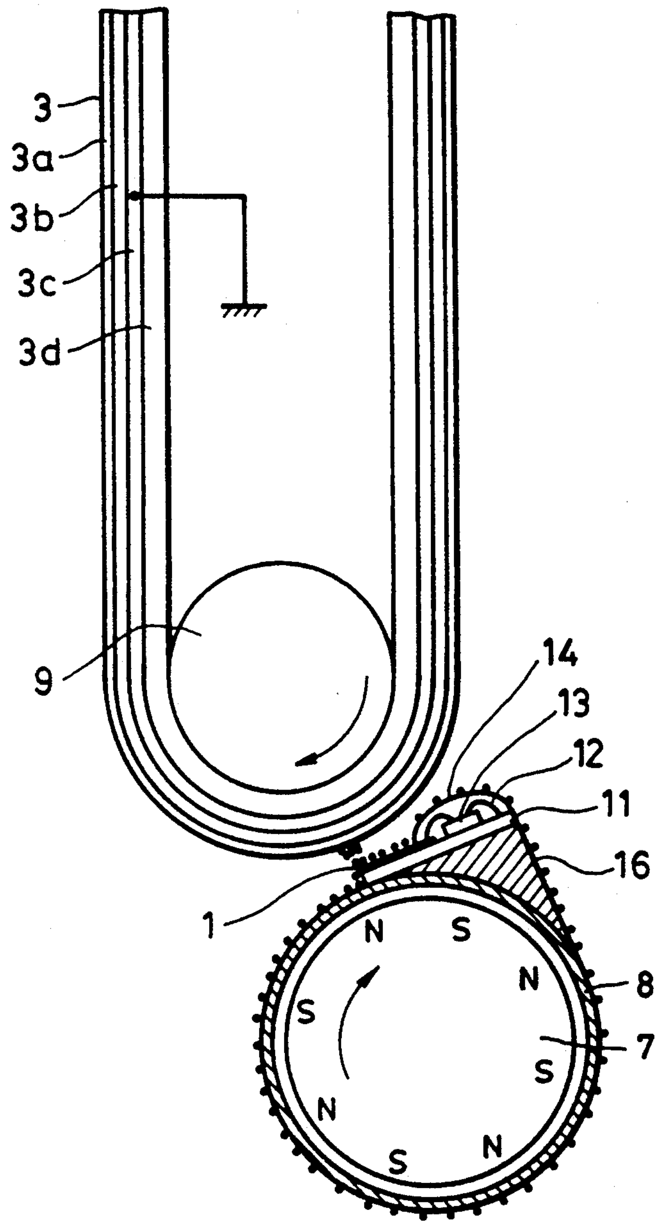
FIG. 7 is a cross-sectional view of a recording unit in which the electrodes shown in FIG. 6 are disposed.

FIG. 5 illustrates a third embodiment of the image forming apparatus according to the present invention. The recording medium 3 and the toner 2 which are used in this embodiment are the same as those used in the first embodiment.

In this embodiment, a conductive plastic member 4' having a surface resistance of $10^8$ Ωcm or less replaces the conventional plastic member 4 in order to suppress generation of charging.

Consequently, the surface of the plastic member 4' is not readily charged and the surface potential thereof is thus maintained substantially at 0 volt. Therefore, application of an undesirable electric field to the recording medium 3 can be avoided, and generation of fog can be prevented.

FIGS. 6 through 9 illustrate a fourth embodiment of an image display apparatus according to the present invention. This image display apparatus employs a rigid substrate in place of the flexible substrate used in the aforementioned embodiments as the substrate on which the recording electrodes are formed. That is, the image display apparatus employs a recording head 15 shown in FIG. 6 which includes a rigid substrate 11 made of an insulating resin, the recording electrodes 1 formed on the substrate 11 in the same manner as that of the first embodiment, voltage application drive elements 13 fabricated on the substrates, bonding wires 12 for performing electric connection of the voltage application drive elements 13, and a sealing resin 14 for protecting the drive elements 13 and the bonding wires 12. Such a recording head 15 is fixed to the non-magnetic cylinder 8 which is the same as that used in the first embodiment by means of a fixing base 16.

In the image display apparatus arranged in the manner described above, since the recording head is located close to the recording medium 3, when the sealing resin 14 is charged, fog may be generated for the reason mentioned in connection with the conventional apparatus.

Figure 8:
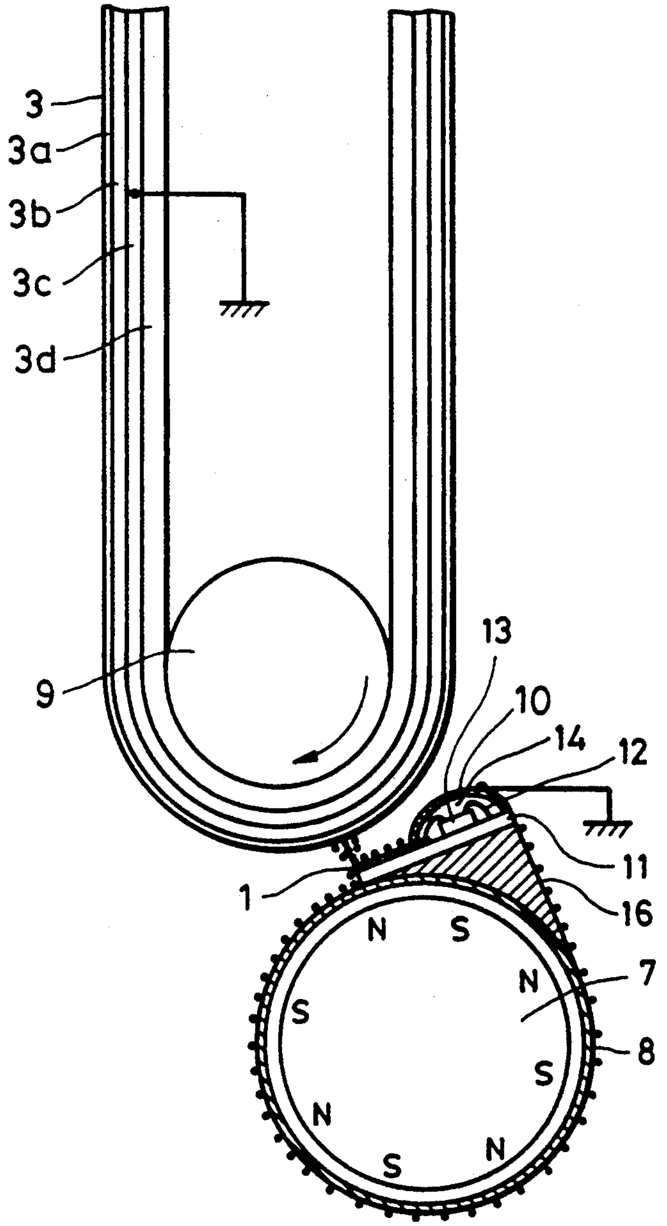
FIG. 8 is a cross-sectional view of the recording unit illustrating a fourth embodiment of the present invention.

Hence, a conductive member 10" may be adhered to the surface of the sealing resin 14 and be grounded through a lead in the same manner as that in the first embodiment, as shown in FIG. 8. Alternatively, a coating material may be coated on the surface of the sealing resin 14 to prevent charging, as in the case of the second embodiment, or the resin itself is made conductive, as in the case of the third embodiment. In the last case, since an excessive drop in the resistance can create a short circuit between the electrodes of the drive elements 13, the resistance of the conductive resin must be set between $10^3$ and $10^8$ Ωcm.

Figure 9:
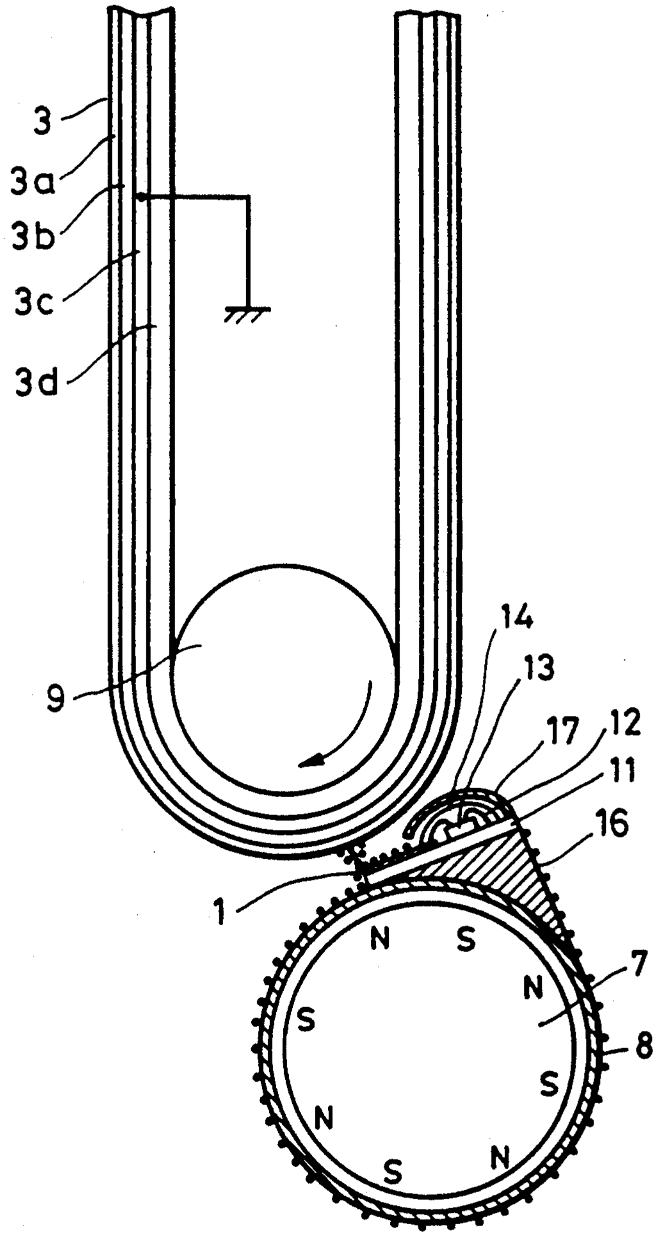
FIG. 9 is a cross-sectional view of a modification of the recording unit shown in FIG. 8.

In order to prevent the effect of a charged sealing resin, a protecting cover 17 may be provided over the sealing resin 14, as shown in FIG. 9. This protective cover 17 may be made of a metal or conductive resin or may be processed in the same manner as in the first and second embodiments.

Figure 10:
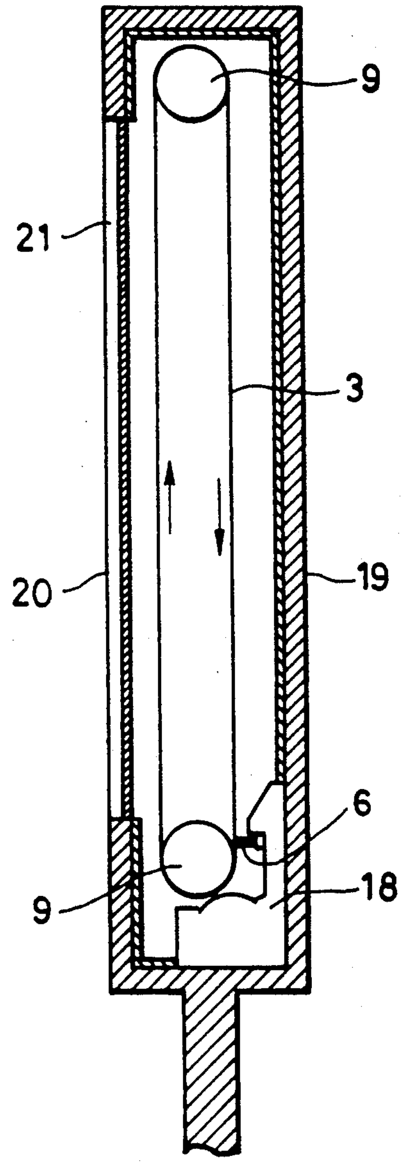
FIG. 10 is a cross-sectional view of an image display apparatus, illustrating a fifth embodiment of the present invention.

FIG. 10 illustrates a fifth embodiment of an image forming apparatus according to the present invention. In this apparatus, a body frame 19 which surrounds the recording medium 3 is made of a resin. In order to prevent charging of the inner wall of the body frame 19, the inner wall is processed in the same manner as that of the first, second or third embodiment. A panel 20 for covering an opening 21 of a display portion is also made of a resin. The panel 20 may be processed in the same manner as in the first embodiment using a transparent conductive film, such as an ITO film. Alternatively, the panel 20 may be processed in the same manner as that of the second embodiment, using a transparent coating material.

The recording member and toner used in the fourth and fifth embodiments are the same as those used in the first embodiment.

The device shown in FIG. 10 can replace the recording electrodes shown in FIG. 1, the necessary electric field being provided by means of electrodes provided in unit 18.

As will be understood from the foregoing description, in the image forming apparatus of the present invention, production of electric charges in the surface of the plastic member located close to the recording medium can be suppressed by processing the plastic member in any of the aforementioned manners, and the potential of the surface of the plastic member which opposes the recording medium can thus be reduced. Consequently, application of an unnecessary electric field to the recording member can be prevented, and generation of fog due to the effect of such an electric field can be eliminated.

While the present invention has been explained in detail by reference to the preferred embodiments thereof, those of ordinary skill in the art will appreciate that many modifications and variations of those illustrative embodiments are possible within the scope of the present invention, which is accordingly not to be limited by the particular details described herein.

What is claimed is:

1. An image forming apparatus comprising:

electrically independent recording electrodes;

a recording medium which is movable relative to said recording electrodes;

developing agent supply means for supplying a conductive developing agent between said recording electrodes and said recording medium;

means for applying a recording signal voltage to said recording electrodes; and a resin member which opposes said recording medium, said resin member having a charging preventing function.

2. The image forming apparatus according to claim 1, wherein said resin member comprises a structure which constitutes part of an apparatus body.

3. The image forming apparatus according to claim 2, wherein said charging preventing function is achieved by said resin member having a conductive-resin portion at a surface of said resin member.

4. The image forming apparatus according to claim 2, wherein said charging preventing function is achieved by a conductive layer provided on a surface of said resin member.

5. The image forming apparatus according to claim 4, wherein said conductive layer is grounded.

6. The image forming apparatus according to claim 5, wherein said apparatus comprises an image display apparatus for displaying images by the developing agent formed on said recording medium.

* * * * *

UNITED STATES PATENT AND TRADEMARK OFFICE
CERTIFICATE OF CORRECTION

PATENT NO. : 5,208,613
DATED : May 4, 1993
INVENTOR(S) : TAKEDA

It is certified that error appears in the above-indentified patent and that said Letters Patent is hereby corrected as shown below:

COLUMN 3

Line 40, "disperse" should read --dispersed--.

Signed and Sealed this

Twenty-sixth Day of April, 1994

Attest:

BRUCE LEHMAN

Attesting Officer

Commissioner of Patents and Trademarks